UNITED STATES PATENT OFFICE.

HORACE KOECHLIN, OF LOERRACH, BADEN, GERMANY.

MANUFACTURE OF COLORING-MATTER.

SPECIFICATION forming part of Letters Patent No. 257,498, dated May 9, 1882.

Application filed April 6, 1882. (No specimens.) Patented in France November 5, 1881, in Belgium November 9, 1881, and in England November 9, 1881.

*To all whom it may concern:*

Be it known that I, HORACE KOECHLIN, a citizen of the Republic of France, but now residing in Loerrach, in the Grand Duchy of Baden, Germany, have invented a new and useful Improvement in Coloring-Matters, which improvement is fully set forth in the following specification.

This invention relates to the production of coloring-matters or dye-stuffs from nitroso derivatives of the tertiary amines, such as nitrosodimethylaniline, or their salts, or their sulphoconjugate acids, or from the chloroquinominides; and it consists in the manufacture of the leuco bases and leuco salts of the bodies obtained by the action of the said nitroso derivatives or chloroquinominides upon tannin, or on principles analogous to tannin, such as cachoutannic, catechic, morintannic, quercitannic, chinatannic, or caffetannic acids, their salts, the tannin of dividivi and of sumac and gallic acid, its salts and ethers. These leuco bases and leuco salts have never, so far as I am aware, been produced prior to my invention, and are themselves, as well as their method of production or preparation, included in the present invention. These reduction products are colored or uncolored matters, which, by oxidation, or sometimes simply by heat, may be transformed into the oxidated violet coloring-matters. The said leuco bases or reduction products may be obtained directly, as by heating or solution of gallate of soda and chlorhydrate of nitrosodimethylaniline, or by the reduction of the bodies obtained by the action of the nitroso derivatives on the tannin or its analogues mentioned. This is how I proceed to obtain such a reduction product directly: I heat an alcohol solution of one part chlorhydrate of nitrosodimethylaniline with two parts of gallic acid previously neutralized with caustic soda; or I prepare nitrosodimethylaniline by decomposing its chlorhydrate with caustic soda, and then heat this nitrosodimethylaniline with tannin or gallic acid in alcohol solution for about two hours.

In order to obtain a similar matter by reduction of the previously-formed coloring-bodies, I may proceed as follows: Having reacted with the chlorhydrate of nitrosodimethylaniline upon tannic or gallic acid and obtained the coloring-matter, I heat a solution of this body with a reducing agent—for instance, with zinc—in acid or alkaline or neutral solution. When the reduction is finished I precipitate by salt or acetic acid the leuco product. This product is not colored, and becomes violet only by oxidation.

Under nitroso derivatives of dimethylaniline are principally to be understood the salts— for instance, the chlorhydrate of nitrosodimethylaniline.

Having now explained the nature of my said invention and the manner in which the same is or may be carried into effect, I would observe that I do not claim broadly the production of violet coloring-matters by the action of nitroso derivatives of the tertiary amines on tannin or by equivalent reaction, such as first mentioned, as this is claimed in Letters Patent No. 253,721, granted to me February 14, 1882; and I would also observe that the present patent is for an improvement which is supplemental to that for which said Letters Patent were granted.

I therefore claim herein—

The production of the matters described—that is to say, the leuco bases and leuco products or reduction products of the bodies obtained by the action of nitroso derivatives upon tannin or equivalent reaction, said leuco bases or reduction products being obtained by the reaction of said bodies or directly, substantially as described.

In testimony whereof I have signed this specification in the presence of two subscribing witnesses.

HORACE KOECHLIN.

Witnesses:
E. HUGUENIN,
DURAND.